May 21, 1940.　　　　H. S. ACKERMAN　　　　2,201,513
VALVE
Filed July 5, 1938
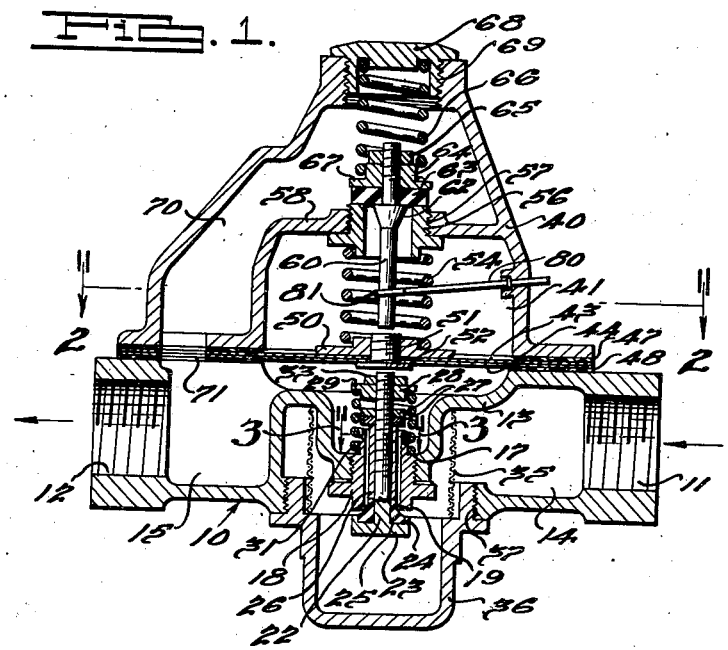
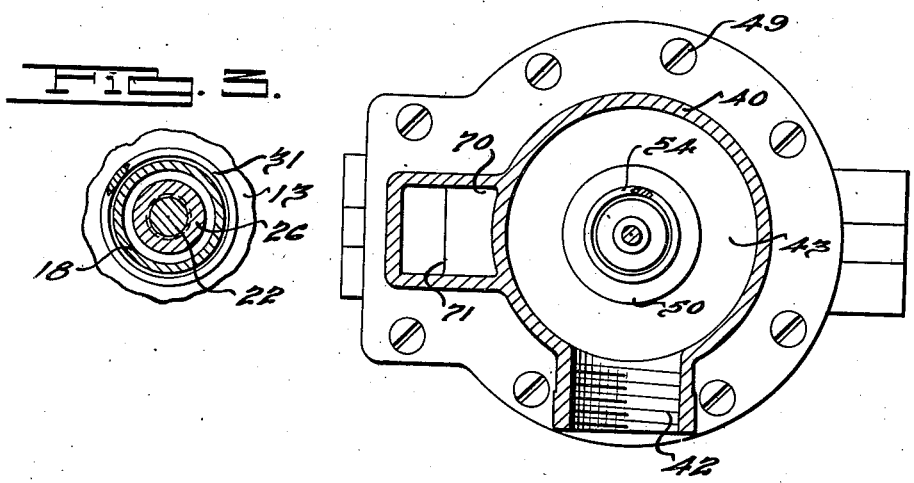
INVENTOR
Harold S. Ackerman.
BY
Harness, Dickey & Pierce.
ATTORNEYS.

Patented May 21, 1940

2,201,513

UNITED STATES PATENT OFFICE 2,201,513

VALVE

Harold S. Ackerman, Aspinwall, Pa.

Application July 5, 1938, Serial No. 217,352

1 Claim. (Cl. 50—23)

The invention relates generally to pressure regulating valves, and it has particular relation to a valve adapted to be employed in a hot water heating system.

In certain respects the invention constitutes an improvement over that embodied in the patent to Wappat 2,014,541, which discloses a valve generally for the same purpose as the present improved structure. The valve disclosed in that patent includes an inlet adapted to be connected to a source of water under pressure, a pressure chamber in communication with the hot water heating system, and a relief chamber separated from the pressure chamber at one side by means of a flexible diaphragm. Separate valves controlled by movement of the diaphragm respectively allow water to flow into the pressure chamber from the inlet when required and water to flow from the pressure chamber into the relief chamber in the event the pressure in such chamber becomes too high. Movement of the diaphragm is governed by separate springs coacting with a pivotal lever disposed in the relief chamber.

One of the objects of the present invention is to provide a valve of this general character which is simpler in construction and less expensive to manufacture.

Another object of the invention is to provide a valve of this type which has a simple and adjustable relation of parts, to the end that adjustments of the valve to cause it to function at various pressures may be readily effected.

Other objects of the invention will become apparent from the following specification, from the drawing relating thereto, and from the claim hereinafter set forth.

For a better understanding of the invention, reference may be had to the drawing, wherein:

Figure 1 is a central, cross-sectional view of a valve constructed according to one form of the invention;

Fig. 2 is a cross-sectional view taken substantially along the line 2—2 of Fig. 1;

Fig. 3 is a cross-sectional view on a larger scale taken substantially along the line 3—3 of Fig. 1;

Referring to Figure 1, the valve illustrated comprises a lower casing part 10, which at one side has a threaded inlet opening 11, and at its other side a threaded outlet opening 12. These openings respectively are adapted to be connected to a source of water under pressure such as an ordinary water line, and to a hot water heating system. Ordinarily in hot water heating systems, expansion tanks are employed to take care of water expansion, and the present invention renders it unnecessary to use such tanks for the reason that a pressure relief is provided to allow water to escape when the pressure becomes too high. It may be further stated that the invention automatically causes water to be again introduced into the system when the pressure decreases.

Intermediate the openings 11 and 12, the casing part 10 has a wall 13 that separates this part of the casing into an inlet chamber 14 and a pressure chamber 15. This wall has a threaded opening 17 into which a bushing 18 is threaded that has a valve seat 19 at its lower end. A valve stem 22 projects upwardly through the bushing 18 and at its lower end has a head 23 provided with a rim 24 which retains a sealing washer 25 in position around the head and adjacent the seat 19. This washer is retained axially in position by a sleeve 26 threaded on the stem which also may serve as a guide for movement of the valve in the opening in the bushing 18. Lock nuts 27 on the stem above the sleeve lock the sleeve in position and also provide an abutment adapted to engage the upper edge of the bushing 18 so as to limit opening movement of the valve stem. Above the lock nuts 27 a spring retaining nut 28 is threaded on the stem and the latter has a flange 29 that retains the upper end of a coil spring 31 which in turn at its lower end engages the upper end of the bushing 18. A nut 33 on the upper end of the valve member serves to lock the nut 28 in position. It will be appreciated that the loading on the spring may be varied by varying the position of the spring retaining nut 28, so that the force required to open the valve may be varied.

For the purpose of straining the water entering the pressure chamber from the inlet, a cylindrical screen 35 is disposed around the valve assembly, and this screen is seated in a cap 36 threaded into a relatively large opening 37 in the lower side of the casing part 10. It will be seen that all parts of the valve assembly, as well as the screen 35, may be installed and removed upon removing the cap 36.

Above the part 10 of the casing, a second part 40 is provided that has a chamber 41 which may be termed a relief chamber. As shown by Figure 2, the chamber 41 is provided with an outlet 42 that may be connected to a drain.

The lower side of the chamber 41 is closed by means of a metal diaphragm comprising two thin sheets 43 and 44 constructed preferably of phosphor bronze. At its edges, the diaphragm extends between rim portions of both parts of the casing and around such rim portions, sealing gaskets 47 and 48 are provided so as to seal the casing at the junction. Screws 49, as shown by Fig. 2, tightly connect such parts of the casing and it is to be understood such screws pass through openings in the rim portions of the diaphragm as well as through the sealing gaskets 47 and 48.

At its center, the diaphragm is provided with a supporting disc 50 which is connected to the diaphragm by means of a threaded pin 51 having a head 52 engaging the lower side of the diaphragm. The diaphragm is normally urged downwardly by means of a preloaded spring 54 which at its lower end engages the disc 50, and at its upper end, a valve bushing 56 threaded through an opening 57 in a wall 58 forming the upper side of the relief chamber 41. A valve stem 60 projects downwardly through the bushing 56 and centrally of the spring 54 to a point adjacent the upper end of the pin 51, and this stem has a conical portion 62 which supports a sealing washer 63 that is locked in position by means of a nut 64 threaded on the upper end of the stem. A lock nut 65 adjustably locks the nut 64 in position, as will be understood. The valve is normally urged downwardly by means of a coil spring 66 engaging at its lower end a flange 67 on the nut 64, and at its upper end a cap 68 threaded into an opening 69 in the upper part of the casing part 40. In this connection it will be appreciated that the valve stem assembly may be removed by removing the cap 68.

It will be noted that a chamber 70 is provided in the casing part 40 separately of the chamber 41 and that this chamber 70 is in communication with the chamber 15 in the lower part 10 of the casing by means of an opening 71 that extends through extended peripheral portions of the diaphragm and the sealing gaskets 47 and 48. Thus, fluid under pressure in chamber 15 is present at the upper side of the upper valve, as well as at the lower side of the diaphragm.

Assuming that the heating system is of the closed type and that the pressure therein is normally caused by height of water in the system, the valve will be adjusted to cause the inlet to open when this pressure is lower than desired and to close when the pressure reaches a predetermined amount. Under these conditions, when the water pressure is too low, the spring 54 moves the diaphragm downwardly and the latter in turn moves against valve stem 22 to overcome spring 31 and open the valve. It will be realized in actual use that the diaphragm will be moved downwardly in a gradual manner as the pressure in the system decreases, and that the increasing inherent resistance to flexing of the diaphragm as well as the resistance of spring 31 both must be overcome to cause the valve to open. Therefore, the proximity of valve stem 22 to the diaphragm and the size of and loading on springs 31 and 54 must be carefully related.

As water then enters the system, the pressure will increase, and since this acts upwardly on the diaphragm, the latter will begin to move upwardly and finally the pressure will be sufficient to allow the inlet valve to close.

After the system is filled with water, expansion of the water will naturally occur as it becomes heated, and the pressure will increase. As the pressure on the water increases, upward pressure on the diaphragm will increase, and if this pressure becomes sufficient, it moves the diaphragm and upper valve stem upwardly overcoming both springs 54 and 66 and the inherent resistance of the diaphragm to movement, and thus the relief valve is opened allowing water to enter the relief chamber. As soon as this pressure is sufficiently relieved, the upper valve closes.

Manifestly, the device may be adjusted to increase and decrease its sensitivity to pressure changes in the heating system and to vary the pressures at which the two valves respectively open. Also, by using two very thin sheets of metal as the diaphragm, greater flexibility is obtained, thus rendering the diaphragm less resistant to movement which is desirable while still providing the durability and non-leaking characteristics of metal. It will be realized that adjustment of the springs 31 and 66 determines respectively the pressures at which the inlet and relief valves open, and that the range of permitted pressure change in the system may be adjusted by adjusting these springs relatively.

For the purpose of testing the operativeness of the relief valve periodically and also relieving it of any sticking, a pin 80 may be slidably mounted in one wall of the casing, and this pin at its inner end has a bifurcated or forked end 81 embracing the valve stem 60. It will be noted that substantial play is provided between the bushing 56 and the valve stem so that by pushing the pin 80, the valve may be rocked laterally, thereby lifting one side of the valve from its seat.

It will be observed that the cap 68 allowing access to the casing is screwed tightly into the casing, so that its annular flange fits tightly against the casing wall. This cap is thus not any external, normally adjustable element and it would be recognized in use that the cap is for access purposes and that it should be screwed up tightly against the casing wall. While the setting of the spring 66 determines the pressure at which the relief valve will open, it is intended that the device in use be in effect safe against accidental or intentional tampering and normally any user who might remove the caps 68 and 36 would replace them and screw them tightly into position. In this event, the setting of the springs would not be in any way affected by removal and reinsertion of the caps 68 and 36. In general, therefore, the valve provides a structure which is free from any external normally adjustable elements in order to avoid or minimize tampering with the device when in use.

Although only one form of the invention has been described and illustrated in detail, it will be apparent to those skilled in the art that various modifications may be made without departing from the scope of the appended claim.

What is claimed is:

A fluid regulating device for automatically regulating the pressure in a hot water heating or similar system, comprising a casing having an inlet chamber adapted to be connected to a source of water under pressure, a relief chamber, and a pressure chamber adapted to be connected to the heating system and extending between the inlet chamber and also to the opposite side of the relief chamber, means including a spring pressed normally closed inlet valve separating the pressure chamber from the inlet chamber, means including a valve stem on the inlet valve for adjusting the inlet valve spring so as to govern the pressure at which the inlet valve opens, means including a spring pressed normally closed relief valve separating said opposite side of the relief chamber from that part of the pressure chamber extending to said opposite side of the relief chamber, a flexible diaphragm separating the first mentioned side of the relief chamber from the pressure chamber, a substantially heavy pre-loaded diaphragm coil spring within the relief chamber and engaging the diaphragm and normally urging it against the fluid in the pressure chamber, and a valve stem extending from the relief valve and through the pre-loaded diaphragm spring to a point in proximity to the side of the diaphragm next to the relief chamber so as to be engaged by the diaphragm, said inlet valve stem extending from the inlet valve to a point in proximity to the other side of the diaphragm, said valves, stems and springs being in alignment with the axis of the diaphragm and being centered on the same axis during movement of the diaphragm, the relief chamber in a direction axially of the diaphragm being located entirely between the diaphragm and relief valve and being of substantial depth axially of the relief valve stem to allow disposal of the diaphragm spring between the diaphragm and relief valve, the construction and arrangement of the parts being further characterized by the casing being free from any external normally adjustable elements in order to avoid or minimize tampering with the device when in use.

HAROLD S. ACKERMAN.